(12) United States Patent
Xu et al.

(10) Patent No.: US 10,313,430 B2
(45) Date of Patent: Jun. 4, 2019

(54) DISTRIBUTED METHOD AND APPARATUS FOR PROCESSING STREAMING DATA

(71) Applicant: BEIJING BAIDU NETCOM SCIENCE AND TECHNOLOGY CO., LTD., Haidian District, Beijing (CN)

(72) Inventors: Yao Xu, Beijing (CN); Cong Wang, Beijing (CN); Yuncong Zhang, Beijing (CN); Jianwei Zhang, Beijing (CN); Xin Huang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 273 days.

(21) Appl. No.: 15/281,273

(22) Filed: Sep. 30, 2016

(65) Prior Publication Data

US 2017/0374137 A1 Dec. 28, 2017

(30) Foreign Application Priority Data

Jun. 23, 2016 (CN) .......................... 2016 1 0465909

(51) Int. Cl.
*H04L 29/06* (2006.01)
*H04L 29/08* (2006.01)

(52) U.S. Cl.
CPC ............ *H04L 67/10* (2013.01); *H04L 65/601* (2013.01); *H04L 65/605* (2013.01)

(58) Field of Classification Search
CPC ....................................................... H04L 67/10
USPC ......................................................... 709/219
See application file for complete search history.

(56) References Cited

U.S. PATENT DOCUMENTS

2003/0182282 A1\* 9/2003 Ripley .............. G06F 17/30477
2009/0094195 A1\* 4/2009 Black ................ G06F 17/30516

FOREIGN PATENT DOCUMENTS

CN 101192148 A 6/2008
CN 104090889 A \* 10/2014

\* cited by examiner

*Primary Examiner* — David R Lazaro
*Assistant Examiner* — Zia Khurshid
(74) *Attorney, Agent, or Firm* — Miller, Matthias & Hull LLP

(57) ABSTRACT

A distributed method and apparatus for processing streaming data are disclosed. A specific implementation of the method includes: encapsulating received streaming data as a first resilient distributed dataset; performing a grouping operation on the first resilient distributed dataset based on time windows, the grouping operation comprising: assigning each data element in the first resilient distributed dataset into a group corresponding to a time window to which a recorded timestamp of the data element belongs, and forming second resilient distributed datasets comprising a limited number of data elements and respectively corresponding to the time windows; encapsulating the second resilient distributed datasets as a nested dataset comprising a plurality of the second resilient distributed datasets; passing, using a predefined traversal operator, each of the second resilient distributed datasets in the nested dataset successively to a batch operator defined in a finite dataset to perform distributed data processing.

13 Claims, 5 Drawing Sheets

DISTRIBUTED METHOD AND APPARATUS FOR PROCESSING STREAMING DATA

CROSS REFERENCE TO RELATED APPLICATION

This application claims the priority of Chinese Patent Application No. 201610465909.3, entitled "Distributed Method and Apparatus for Processing Streaming Data," filed on Jun. 23, 2016, the content of which is incorporated herein by reference in its entirety.

TECHNICAL FIELD

The present disclosure relates to the field of computer technology, specifically to the field of big data processing technology, and more specifically to a distributed method and apparatus for processing streaming data.

BACKGROUND

With the development of the big data computing technology, applications based on data processing has gained widespread attention. The structures of data sources show a trend of diversification. The data generated by the data sources not only contain the traditional non-real-time, static structural data, but also many real-time, dynamically generated unstructured data streams. A real-time computing technology for the distributed streaming data is needed to acquire the important information carried by the continuously arriving unstructured data sequences.

Currently, commonly used frameworks to process streaming data include the Storm framework and the Spark framework. The advanced encapsulation of the presentation layer of the distributed real-time computing has the corresponding Storm native interfaces and Resilient Distributed Datasets (RDD). Here, the Storm native interfaces have an inferior encapsulation and interface abstraction, a relatively inconvenient usability of the interfaces, a quite complex implementation of the time window and a relatively poor code reusability. Using the RDD interfaces has the issues of mandatory specifying driving the time window by the data inflow time, not supporting nesting, being unable to copy the codes, and the batch and streaming computing being unable to guarantee interface compatibility, and the like.

SUMMARY

An objective of the present application is to provide an improved distributed method and apparatus for processing streaming data, in order to solve the technical problem mentioned in the foregoing Background section.

In a first aspect, the present application provides a distributed method for processing streaming data, which comprises: encapsulating received streaming data as a first resilient distributed dataset; performing a grouping operation of the first resilient distributed dataset based on time windows, the grouping operation comprising: assigning each data element in the first resilient distributed dataset into a group corresponding to the time window to which a recorded timestamp of the data element belongs, and forming second resilient distributed datasets, each of the second resilient distributed datasets comprising a limited number of data elements and corresponding to the time window; encapsulating the second resilient distributed datasets as a nested dataset comprising a plurality of the second resilient distributed datasets; passing, using a predefined traversal operator, each of the second resilient distributed datasets in the nested dataset successively to a batch operator defined in a finite dataset to perform distributed data processing.

In some embodiments, encapsulating the second resilient distributed datasets as the nested dataset comprising the plurality of the second resilient distributed datasets comprises: encapsulating a time point selected from each of the time windows as a key and each of the second resilient distributed datasets as a value as the nested dataset storing the second resilient distributed datasets in a form of a key-value pair, and passing, using the predefined traversal operator, each of the second resilient distributed datasets in the nested dataset successively to the batch operator defined in the finite dataset to perform the distributed data processing comprises: passing each of the second resilient distributed datasets as the value in the nested dataset successively to the batch operator defined in the finite dataset to perform the distributed data processing.

In some embodiments, encapsulating the time point selected from each of the time window as the key and using each of the second resilient distributed dataset as the value as the nested dataset storing the second resilient distributed datasets in the form of the key-value pair comprises: setting the key of the key-value pair to a starting time point of the time window.

In some embodiments, the method further comprises: obtaining a time step set by an user, and setting a value of a time interval between adjacent time windows to the time step.

In some embodiments, the method further comprises: setting a value of a duration of the time window to the time step.

In some embodiments, the method further comprises: obtaining a step number set by the user, and setting a value of a duration of the time window to a product of the step number and the time step.

In a second aspect, the present application provides a distributed apparatus for processing streaming data, which comprises: a first encapsulating unit for encapsulating received streaming data as a first resilient distributed dataset; a grouping unit for performing a grouping operation of the first resilient distributed dataset based on time windows, the grouping operation comprising: assigning each data element in the first resilient distributed dataset into a group corresponding to the time window to which a recorded timestamp of the data element belongs, and forming second resilient distributed datasets, each of the second resilient distributed datasets comprising a limited number of data elements and corresponding to the time window; a second encapsulating unit for encapsulating the second resilient distributed datasets as a nested dataset comprising a plurality of the second resilient distributed datasets; and an execution unit for passing, using a predefined traversal operator, each of the second resilient distributed datasets in the nested dataset successively to a batch operator defined in a finite dataset to perform distributed data processing.

In some embodiments, the second encapsulation unit is further used for: encapsulating a time point selected from each of the time windows as a key and each of the second resilient distributed datasets as a value as the nested dataset storing the second resilient distributed datasets in a form of a key-value pair; and the execution unit is further used for: passing each of the second resilient distributed datasets as the value in the nested dataset successively to the batch operator defined in the finite dataset to perform the distributed data processing.

In some embodiments, the execution unit is further used for: setting the key of the key-value pair to a starting time point of the time window.

In some embodiments, the apparatus further comprises: a window interval setting unit for obtaining a time step set by an user, and setting a value of a time interval between adjacent time windows to the time step.

In some embodiments, the apparatus further comprises: a window duration setting unit for setting a value of a duration of the time window to the time step.

In some embodiments, the apparatus further comprises: a window duration setting unit for obtaining a step number set by the user, and setting a value of a duration of the time window to a product of the step number and the time step.

The distributed processing method and apparatus for the streaming data provided in the present application groups the resilient distributed dataset formed by encapsulating the streaming data, and generates the nested dataset from the second resilient distributed dataset to which each time window corresponds, and uses the predefined operator to respectively process the each second resilient distributed dataset in the nested dataset; since the single second resilient distributed dataset in the nested dataset is the finite dataset containing the finite data, the existing operator may be reused, then the reusability of the operator is improved, and the development cost for designing the additional operator is reduced. In addition, in this solution the batch and different streaming engines may use the same code to achieve the same computing semantics, and this solution may reduce the work amount needed for modifying the code when switching different engines.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF PREFERRED EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
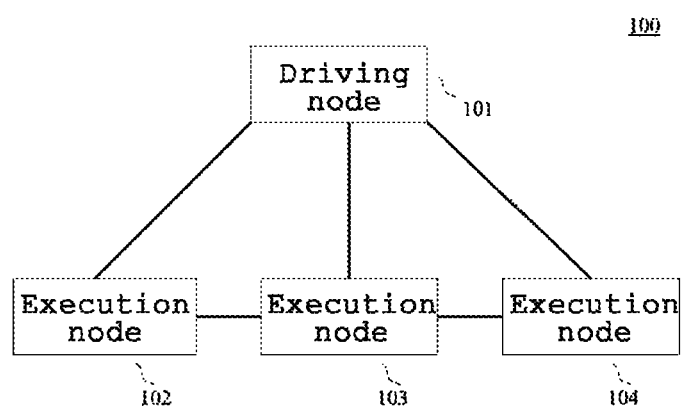
FIG. 1 is an architectural diagram of an exemplary system in which the present application may be implemented.

FIG. 1 shows an architectural diagram of an exemplary system 100 in which the present application may be implemented.

As shown in FIG. 1, the system 100 may include a driving node 101 and execution nodes 102, 103, 104. The driving node 101 and the execution nodes 102, 103, 104 may communicate through a network which may comprise various types of connections, such as wire, wireless communication links, or fiber optic cables and so on.

The driving node 101 may assign the processing tasks of data to the execution nodes 102, 103, 104 for execution, and each execution node is specifically responsible for performing the assigned processing task.

It should be noted that, the distributed method for processing the streaming data provided by the embodiment of the present application is generally performed by the driving node 101, and some steps may be performed by the execution nodes 102, 103, 104; accordingly, the distributed apparatus for processing the streaming data is generally provided in the driving node 101, and some units may also be provided in the execution nodes 102, 103, 104.

It should be appreciated that, the numbers of the driving node and the execution nodes in FIG. 1 are merely illustrative. Any number of the driving node and the execution nodes may be provided based on the actual requirements.

Figure 2:
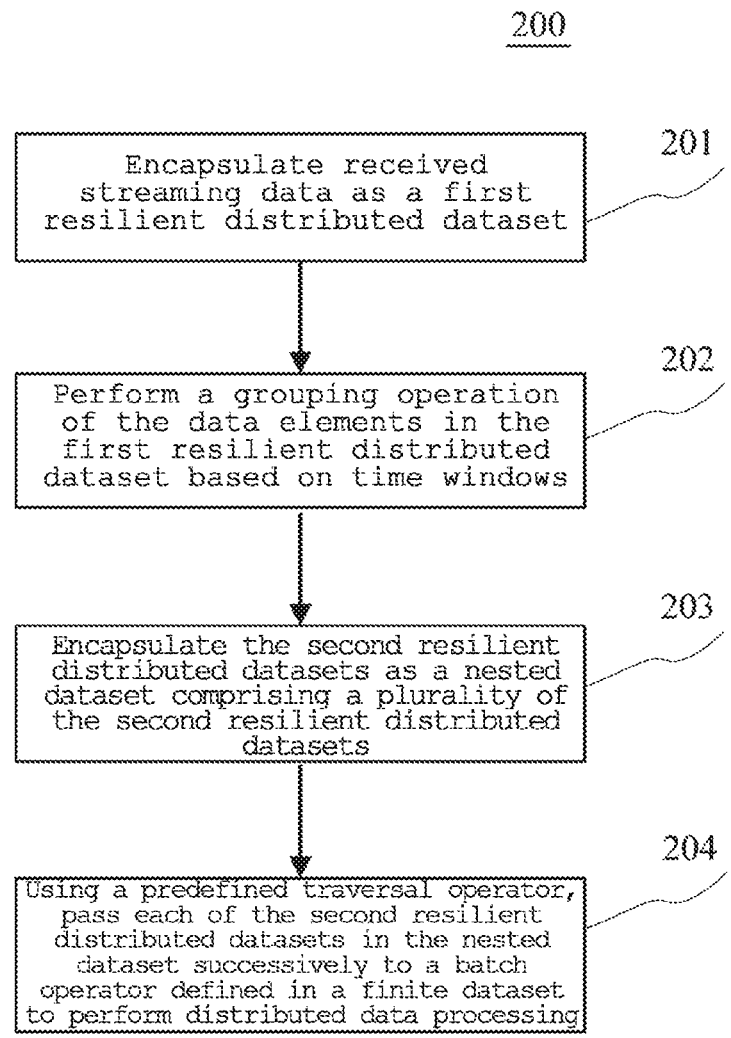
FIG. 2 is a flowchart of a distributed method for processing streaming data according to an embodiment of the present application.

Further referring to FIG. 2, a flow 200 of the distributed method for processing streaming data according to an embodiment of the present application is shown. The distributed method for processing the streaming data includes the following steps:

Step 201: Encapsulate received streaming data as a first resilient distributed dataset.

In this embodiment, electronic devices (such as the driving node 101 shown in FIG. 1) on which the distributed method for processing the streaming data operates may receive streaming data from a streaming data source which uninterruptedly generates data via a wired or a wireless connection. It should be noted that the above-mentioned wireless connection may include, but is not limited to, 3G/4G connection, WiFi connection, Bluetooth connection, WiMAX connection, Zigbee connection, ultra wideband (UWB) connection, and other known or future developed wireless connection method. Each data element in the received streaming data may include a timestamp for identifying the time of the data. Optionally, the time may be the time when data flows in, and also may be other time related to the data (e.g., data generation time). The electronic device may perform encapsulation processing on the received streaming data, encapsulating the streaming data in the form of data in the resilient distributed dataset, to form a first resilient distributed dataset for subsequent processing. Since each data element in the streaming data includes a corresponding timestamp, each data element in the encapsulated first resilient distributed dataset also has the timestamp. Generally, since the streaming data may be generated continuously, the encapsulated first resilient distributed dataset may comprise an unlimited number of data elements.

Step 202: Perform a grouping operation of the data elements in the first resilient distributed dataset based on time windows.

In this embodiment, based on the first resilient distributed dataset generated in step 201, the electronic device may perform the grouping operation of the first resilient distributed dataset based on the time windows first. In the grouping operation, based on the correlation between the time stamp and the time window, the data element may be grouped into a group corresponding to the time window to which the timestamp of the data element belongs, such that second resilient distributed datasets corresponding to respective time window are formed after the grouping operation. The duration of the time window may be set automatically by the system, or may be set by the user. Generally, since the first resilient distributed dataset may include an unlimited number of data elements, and due to the infiniteness of the time window, the grouping operation may form an unlimited number of second resilient distributed datasets. However, since the duration of a single time window is limited, the second resilient distributed dataset corresponding to respective time window comprises a limited number of data elements, i.e., the second resilient distributed dataset may be a finite dataset.

Step 203: Encapsulate the second resilient distributed datasets as a nested dataset comprising a plurality of the second resilient distributed datasets.

In this embodiment, based on the second resilient distributed datasets formed at step 202 and respectively corresponding to the time window, the electronic device may gather each second resilient distributed dataset together, and encapsulate the second resilient distributed datasets to construct the nested dataset including a plurality of the second resilient distributed datasets. The so-called nested dataset means that each element in the dataset is also a dataset.

Step 204: Using a predefined traversal operator, pass each of the second resilient distributed datasets in the nested dataset successively to a batch operator defined in a finite dataset to perform distributed data processing.

In this embodiment, the electronic device may further process the nested dataset generated at step 203. As described above, since the streaming data may be data that is continuously generated, there may be an unlimited number of time windows, and the nested dataset formed at step 203 may also comprise an unlimited number of second resilient distributed datasets, while each of the second flexible distributed datasets is a dataset comprising a limited number of elements. Therefore, the traversal operator predefined in the nested dataset may be used to pass the second resilient distributed datasets in the above mentioned nested dataset successively to the batch operator defined in the finite dataset, such that the batch operator performs distributed processing on each of the nested datasets, respectively. Specifically, the above-mentioned traversal operator may be the apply method or other relevant methods in Java. The above-mentioned batch operator may be any function which may process the finite dataset, such as the clustering operator kmeans.

In some optional implementations of this embodiment, step 203 may further comprise: encapsulating a time point selected from each of the time windows as a key and each of the second resilient distributed dataset as a value as the nested dataset storing the second resilient distributed datasets in the form of a key-value pair; passing, using the predefined traversal operator, each of the second resilient distributed datasets in the nested dataset successively to the batch operator defined in the finite dataset to perform the distributed data processing of step 204 may specifically comprise: passing each of the second resilient distributed datasets as the value in the nested dataset successively to the batch operator defined in the finite dataset to perform the distributed data processing. In this embodiment, the encapsulated nested dataset stores the second resilient distributed dataset in the form of the key-value pairs. The key portion is set as a time point within the range of each time window, and the value portion is used to store the second resilient distributed dataset. The time point of the time window used as the key may be determined in accordance with a uniform standard, for example, may be the middle or termination time point of the time window. When the traversal operator is used to traverse the nested dataset, each of the second resilient distributed datasets in the nested dataset may be respectively processed only by the traversal operator for traversing the values in the nested dataset in combination with the batch operator for the normal resilient distributed dataset (containing a limited number of elements). In this implementation, the traversal operator for traversing the values in the nested dataset may generally be written as apply_values.

In practice, the operations of steps 202, 203, and 204 may be triggered by the Java code rdd.window_into (Window (1 hour)).apply_values (kmeans). rdd may be the first resilient distributed dataset encapsulated at step 201. The the first resilient distributed dataset may divide the time window by one hour using window_into (Window (1 hour)), so that the first resilient distributed dataset is grouped to form the second resilient distributed datasets, and to form the nested dataset. apply_values is a traversal operator for traversing each value in the nested dataset, which is used to pass each value (i.e., the second resilient distributed dataset) in the second resilient distributed dataset to the clustering operator kmeans for processing. The operator kmeans may perform clustering operation on the second resilient distributed datasets, respectively. It should be noted that the above mentioned code is merely illustrative, and in practice the above mentioned process may also be performed by other codes.

In some optional implementations of this embodiment, the key name portion of the key-value pair data may be uniformly set to the starting time point of the time window.

According to the method provided by the above mentioned embodiment of this application, the resilient distributed datasets formed by encapsulating the streaming data the time windows are grouped based on the time windows, and the nested dataset is generated using the second resilient distributed datasets respectively corresponding to the time windows, and each of the second resilient distributed datasets in the nested dataset is processed using the predefined operator. Since each of the second resilient distributed datasets in the nested dataset is a finite dataset containing a limited number of data elements, the existing operator may be reused, improving the reusability of the operator and reducing the development costs for designing the additional operator. In addition, when switching to the batch processing engine, the same solution may be adopted to group the batch data every time based on the time windows, form the nested dataset comprising a plurality of finite datasets, and use the traversal algorithm to pass the finite datasets to the batch operator for processing. Therefore, this scheme may implement the same computing semantics by using the same code in both of the batch and streaming engines, and reduce the workload required for modifying the codes when switching among different processing engines.

Figure 3:
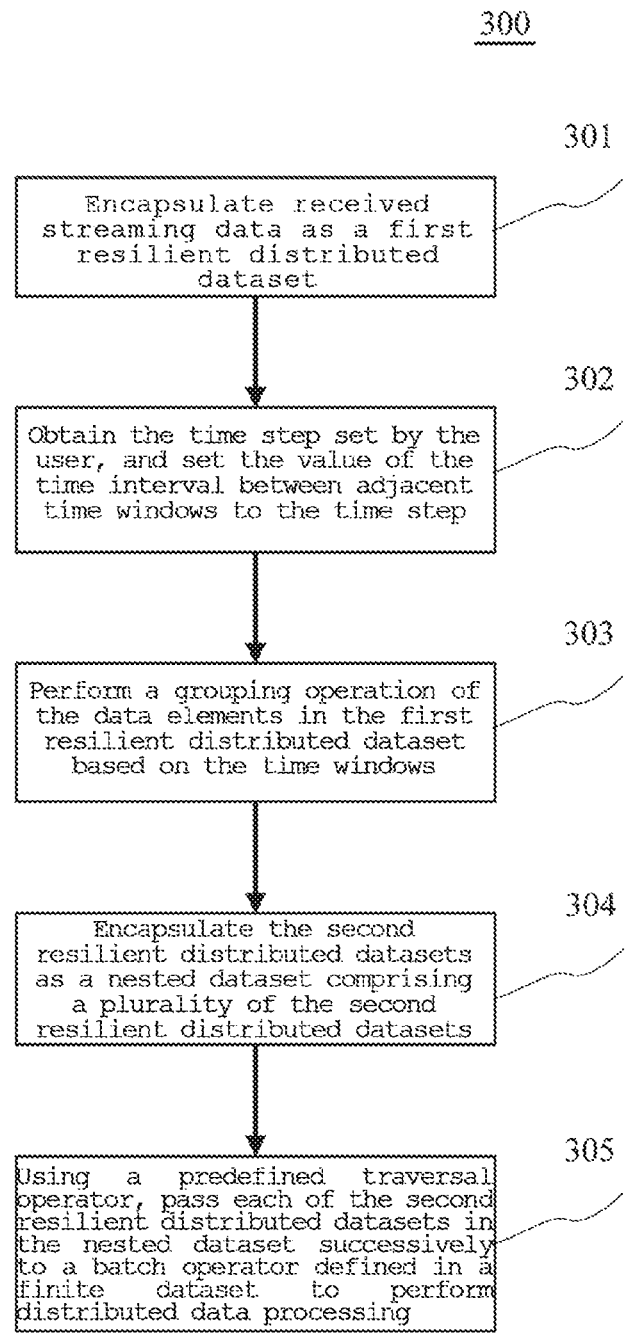
FIG. 3 is a flowchart of a distributed method for processing streaming data according to another embodiment of the present application.

Further referring to FIG. 3, a flow 300 of a distributed method for processing streaming data according to another embodiment is shown. The flow 300 of the distributed method for processing the streaming data includes the following steps:

Step 301: Encapsulate received streaming data as a first resilient distributed dataset.

In this embodiment, the concrete process of step 301 may refer to step 201 of the embodiment corresponding to FIG. 2.

Step 302: Obtain the time step set by the user, and set the value of the time interval between adjacent time windows to the time step.

In this embodiment, the electronic device may obtain the time step set by the user. In practice, the time step set by the user may be input as a parameter such that the electronic device obtains the time step and performs setting processing based on the time step, to set the time interval between adjacent time windows to the time step.

It should be noted that, adjacent time windows may be time continuous, or also overlap in time. When adjacent time windows are time continuous, the starting time point of the current time window and the ending time point of the previous time window may be continuous. For example, when the shortest time unit is a second, the starting time point of the current time window is the fifth second, and the ending time point of the previous time window is the fourth second. When adjacent time windows overlap in time, the starting time point of the current time window may be a time point within the previous time window. For example, the current time window lasts from the second second to the sixth second, the time of the previous time window may last from the zeroth second to the fourth second, and thus the starting time point (i.e., the second second) of the current time window is between 0-4 seconds.

The time interval between adjacent time windows may also be referred to as a step value, and the step value may be set by the user. The duration of the time window generally may be an integral multiple of the step value, and the multiple may be referred to as a step number.

Step 303: Perform a grouping operation of the data elements in the first resilient distributed dataset based on the time windows.

In this embodiment, the concrete process of step 303 may refer to step 202 in the embodiment corresponding to FIG. 2.

Step 304: Encapsulate the second resilient distributed datasets as a nested dataset comprising a plurality of the second resilient distributed datasets.

In this embodiment, the concrete process of step 304 may refer to step 203 in the embodiment corresponding to FIG. 2.

Step 305: Using a predefined traversal operator, pass each of the second resilient distributed datasets in the nested dataset successively to a batch operator defined in a finite dataset to perform distributed data processing.

In this embodiment, the concrete process of step 305 may refer to step 204 in the embodiment corresponding to FIG. 2.

In some optional implementations of this embodiment, the value of the duration of each of the time windows may be set to the time step. In this implementation, when the user does not specifically set the duration of the time window, the electronic device also directly sets the above mentioned time step (i.e., the value of the time interval between adjacent time windows) to the duration of the time window. At this time, adjacent time windows are time continuous.

In some optional implementations of this embodiment, the above mentioned distributed method for processing the streaming data further comprises the following steps: obtaining a step number set by the user; setting the value of the duration of the time window to the product of the step number and the time step. In this implementation, the user may set the step number. The electronic device may obtain the step number, and multiple the step number by the time step, and the resulting time may be used as the duration of the time window.

In practice, the user may set the Java code used for performing the grouping operation and encapsulating the nested dataset to be window_into (Window (5 s, 1)), where 5 s is the time step of five seconds set by the user, and the electronic device may set five seconds as the interval between adjacent time windows. 1 is the step number set by the user, and the electronic device may set the product of five seconds and one (still five seconds) as the duration of the time window. The time windows are, in order, 0-4 s, 5-9 s, 10-14 s . . . . Assuming the data stream is (1 s, 1), (9 s, 2), (11 s, 3), (8 s, 4), (2 s, 5), (20 s, 6), when the first resilient distributed dataset encapsulated from the data stream is processed by the above mentioned setting method, the formed nested dataset may be represented as:

```
{
    0s: [(1, 1s), (5, 2s)],
    5s: [(2, 9s), (4, 8s)],
    10s: [(3, 11s)],
    15s: [ ],
    20s: [(6, 20s)],
    ...
}
```

Thereafter, distributed data processing is performed on each of the second resilient distributed datasets (e.g., [(1, 1 s), (5, 2 s)], [(2, 9 s), (4, 8 s)]) in the nested dataset using the traversal operator in combination with the batch operator.

As can be seen from FIG. 3, compared with the embodiment corresponding to FIG. 2, the flow 300 of the distributed method for processing the streaming data in this embodiment highlights setting the interval between the time windows based on the time step set by the user, improving the operational flexibility and thus being applicable to a wider range of application scenarios.

Figure 4:
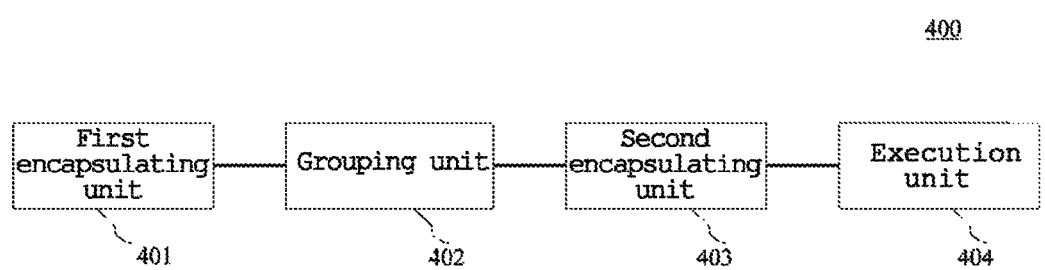
FIG. 4 is a schematic structural diagram of a distributed apparatus for processing streaming data according to an embodiment of the present application.

Further referring to FIG. 4, as an implementation of the method shown in the above mentioned figures, the present application provides an embodiment for a distributed apparatus for processing streaming data. This apparatus embodiment corresponds to the method embodiment as shown in FIG. 2. The apparatus may be specifically applied to various electronic devices.

As shown in FIG. 4, the distributed apparatus 400 for processing stream data according to this embodiment includes: a first encapsulating unit 401, a grouping unit 402, a second encapsulating unit 403 and an execution unit 404. The first encapsulating unit 401 is used for encapsulating received streaming data as a first resilient distributed dataset; the grouping unit 402 is used for performing a grouping operation of the first resilient distributed dataset based on time windows, the grouping operation comprising: assigning each data element in the first resilient distributed dataset into a group corresponding to the time window to which a recorded timestamp of the data element belongs, and forming second resilient distributed datasets, each of the second resilient distributed datasets comprising a limited number of data elements and corresponding to the time window; the second encapsulating unit 403 is used for encapsulating the second resilient distributed datasets as a nested dataset comprising a plurality of the second resilient distributed datasets; and the execution unit 404 is used for passing, using a predefined traversal operator, each of the second resilient distributed datasets in the nested dataset successively to a batch operator defined in a finite dataset to perform distributed data processing.

In this embodiment, the concrete processes of the first encapsulating unit 401, the grouping unit 402, the second encapsulating unit 403 and the execution unit 404 of the distributed apparatus 400 for processing the streaming data can respectively refer to step 201, step 202, step 203, and step 204 of the embodiment corresponding to FIG. 2, and will not be repeated herein.

In some optional implementations of this embodiment, the second encapsulating unit 403 is further used for: encapsulating a time point selected from each of the time windows as a key and each of the second resilient distributed datasets as a value as the nested dataset storing the second resilient distributed datasets in a form of a key-value pair. The execution unit 404 is further used for: passing each of the second resilient distributed datasets as the value in the nested dataset successively to the batch operator defined in the finite dataset to perform the distributed data processing. The concrete process of this implementation can refer to the implementations in the embodiment corresponding to FIG. 2, and will not be repeated herein.

In some optional implementations of this embodiment, the above mentioned execution unit 404 is further used for: setting the key of the key-value pair to a starting time point of the time window. The concrete process of this implementation can refer to the implementations in the embodiment corresponding to FIG. 2, and will not be repeated herein.

In some optional implementations of this embodiment, the above apparatus 400 further comprises a window interval setting unit (not shown), for obtaining a time step set by an user, and setting the value of the time interval between adjacent time windows to the time step. The concrete process of this implementation can refer to the embodiment corresponding to FIG. 3, and will not be repeated herein.

In some optional implementations of this embodiment, the above apparatus 400 also includes a window duration setting unit (not shown) for setting the value of the duration of the time window to the time step. The concrete process of this implementation can refer to the implementations in the embodiment corresponding to FIG. 3, and will not be repeated herein.

In some optional implementations of this embodiment, the above apparatus 400 further includes a window duration setting unit (not shown) for obtaining a step number set by the user, and setting the value of the duration of the time window to the product of the step number and the time step. The concrete process of this implementation can refer to the implementations in the embodiment corresponding to FIG. 3, and will not be repeated herein.

Figure 5:
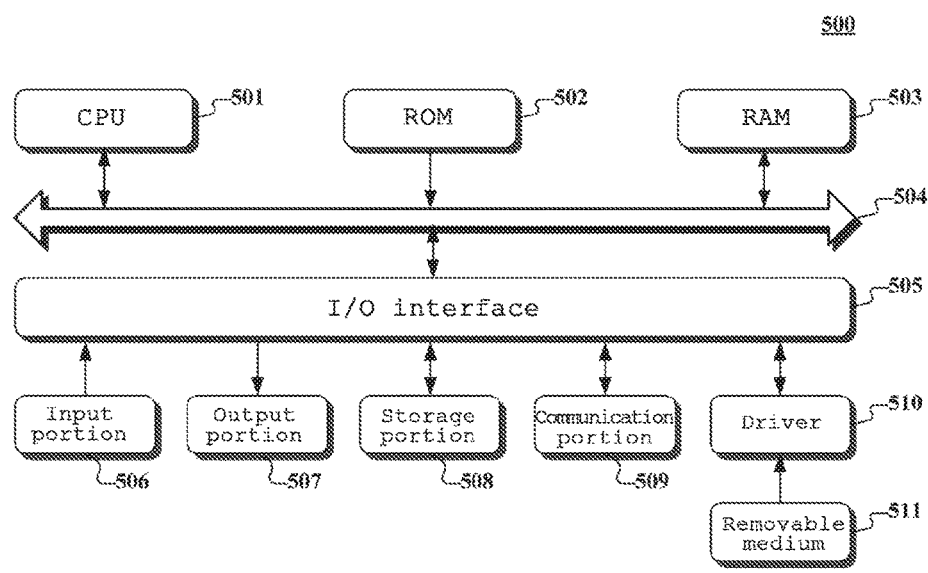
FIG. 5 is a schematic structural diagram of a computer system adapted to implement a terminal device or a server of the embodiments of the present application.

Referring to FIG. 5, a schematic structural diagram of a computer system 500 adapted to implement a driving node or an execution node of the embodiments of the present application is shown.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flowcharts may be implemented in a computer software program. For example, an embodiment of the present disclosure includes a computer program product, which comprises a computer program that is tangibly embedded in a machine-readable medium. The computer program comprises program codes for executing the method of the flowcharts. In such an embodiment, the computer program may be downloaded and installed from a network via the communication portion 509, and/or may be installed from the removable media 511.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units involved in the embodiments of the present application may be implemented by way of software or hardware. The described units may also be provided in a processor, for example, described as: a processor, comprising a first encapsulating unit, a grouping unit, a second encapsulating unit and a generating unti, where the names of these units or modules are not considered as a limitation to the units or modules. For example, the first encapsulating unit may also be described as "a unit for encapsulating received streaming data as a first resilient distributed dataset".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The one or more programs, when executed by a device, cause the device to: encapsulate received streaming data as a first resilient distributed dataset; performing a grouping operation of the first resilient distributed dataset based on time windows, the grouping operation comprising: assigning each data element in the first resilient distributed dataset into a group corresponding to the time window to which a recorded timestamp of the data element belongs, and forming second resilient distributed datasets, each of the second resilient distributed datasets comprising a limited number of data elements and corresponding to the time window; encapsulating the second resilient distributed datasets as a nested dataset comprising a plurality of the second resilient distributed datasets; passing, using a predefined traversal operator, each of the second resilient distributed datasets in the nested dataset successively to a batch operator defined in a finite dataset to perform distributed data processing.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A distributed method for processing streaming data, comprising:
    encapsulating received streaming data as a first resilient distributed dataset;
    performing a grouping operation on the first resilient distributed dataset based on time windows, the grouping operation comprising: assigning each data element in the first resilient distributed dataset into a group corresponding to a time window to which a recorded timestamp of the data element belongs, and forming second resilient distributed datasets comprising a limited number of data elements and respectively corresponding to the time windows;
    encapsulating the second resilient distributed datasets as a nested dataset comprising a plurality of the second resilient distributed datasets;
passing, using a predefined traversal operator, each of the second resilient distributed datasets in the nested dataset successively to a batch operator defined in a finite dataset to perform distributed data processing.

2. The method according to claim 1, wherein,
    the encapsulating the second resilient distributed datasets as the nested dataset comprising the plurality of the second resilient distributed datasets comprises:
    encapsulating a time point selected from each of the time windows as a key and each of the second resilient distributed datasets as a value as the nested dataset storing the second resilient distributed datasets in a form of a key-value pair, and
    the passing, using the predefined traversal operator, each of the second resilient distributed datasets in the nested dataset successively to the hatch operator defined in the finite dataset to perform the distributed data processing comprises:
    passing each of the second resilient distributed datasets as the value in the nested dataset successively to the batch operator defined in the finite dataset to perform the distributed data processing.

3. The method according to claim 2, wherein the encapsulating the time point selected from each of the time window as the key and using each of the second resilient distributed dataset as the value as the nested dataset storing the second resilient distributed datasets in the form of the key-value pair comprises:
    setting the key of the key-value pair to a starting time point of the time window.

4. The method according to claim 1, further comprising:
    obtaining a time step set by an user, and setting a value of a time interval between adjacent time windows to the time step.

5. The method according to claim 4, further comprising:
    setting a value of a duration of the time window to the time step.

6. The method according to claim 4, further comprising:
    obtaining a step number set by the user, and setting a value of a duration of the time window to a product of the step number and the time step.

7. A distributed apparatus for processing streaming data, comprising:
    at least one processor; and
    a memory storing instructions, the instructions when executed by the at least one processor, cause the at least one processor to perform operations, the operations comprising:
    encapsulating received streaming data as a first resilient distributed dataset;
    performing a grouping operation on the first resilient distributed dataset based on time windows, the grouping operation comprising: assigning each data element in the first resilient distributed dataset into a group corresponding to a time window to which a recorded timestamp of the data element belongs, and forming second resilient distributed datasets comprising a limited number of data elements and respectively corresponding to the time windows;
    encapsulating the second resilient distributed datasets as a nested dataset comprising a plurality of the second resilient distributed datasets; and
    passing, using a predefined traversal operator, each of the second resilient distributed datasets in the nested dataset successively to a batch operator defined in a finite dataset to perform distributed data processing.

8. The apparatus according to claim 7, wherein,
    the encapsulating the second resilient distributed datasets as the nested dataset comprising the plurality of the second resilient distributed datasets comprises: encapsulating a time point selected from each of the time windows as a key and each of the second resilient distributed datasets as a value as the nested dataset storing the second resilient distributed datasets in a form of a key-value pair, and
    the passing, using the predefined traversal operator, each of the second resilient distributed datasets in the nested dataset successively to the batch operator defined in the finite dataset to perform the distributed data processing comprises: passing each of the second resilient distributed datasets as the value in the nested dataset successively to the batch operator defined in the finite dataset to perform the distributed data processing.

9. The apparatus according to claim 8, wherein the encapsulating the time point selected from each of the time window as the key and using each of the second resilient distributed dataset as the value as the nested dataset storing the second resilient distributed datasets in the form of the key-value pair comprises: setting the key of the key-value pair to a starting time point of the time window.

10. The apparatus according to claim 7, wherein he operations further comprise:

obtaining a time step set by an user, and setting a value of a time interval between adjacent time windows to the time step.

11. The apparatus according to claim 10, wherein the operations further comprise:

setting a value of a duration of the time window to the time step.

12. The apparatus according to claim 10, wherein the operations further comprise:

obtaining a step number set by the user, and setting a value of a duration of the time window to a product of the step number and the time step.

13. A non-transitory storage medium storing one or more programs, the one or more programs when executed by an apparatus, causing the apparatus to perform a distributed method for processing streaming data, the method comprising:

encapsulating received streaming data as a first resilient distributed dataset;

performing a grouping operation on the first resilient distributed dataset based on time windows, the grouping operation comprising: assigning each data element in the first resilient distributed dataset into a group corresponding to a time window to which a recorded timestamp of the data element belongs, and forming second resilient distributed datasets comprising a limited number of data elements and respectively corresponding to the time windows;

encapsulating the second resilient distributed datasets as a nested dataset comprising a plurality of the second resilient distributed datasets;

passing, using a predefined traversal operator, each of the second resilient distributed datasets in the nested dataset successively to a batch operator defined in a finite dataset to perform distributed data processing.

* * * * *